Jan. 3, 1933.    R. C. CROSLEN    1,893,132
QUICK ACTING COUPLING
Filed Nov. 12, 1929
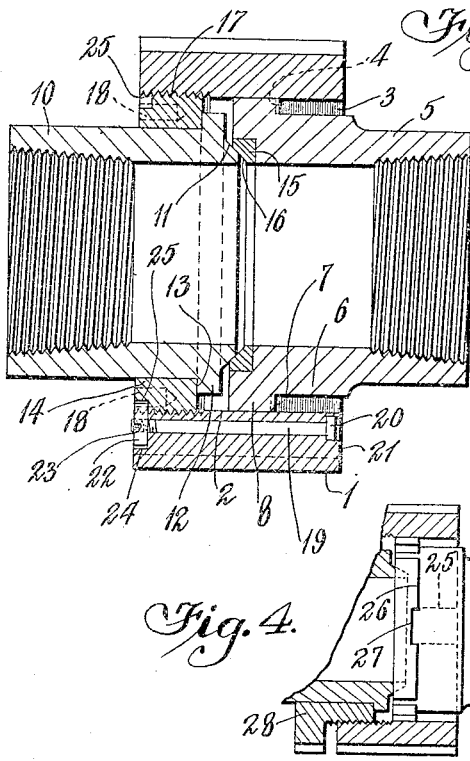
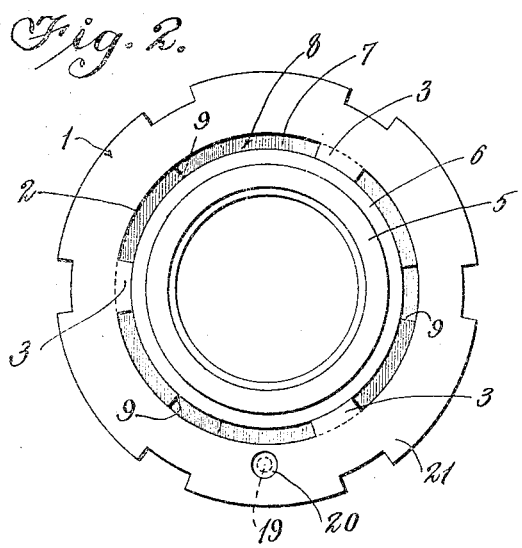
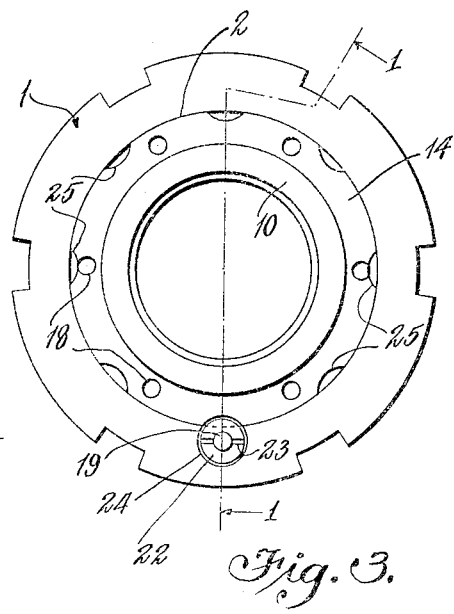
Inventor
Roy C. Croslen
By Lyon+Lyon
Attorneys Patented Jan. 3, 1933

1,893,132

UNITED STATES PATENT OFFICE

ROY C. CROSLEN, OF WHITTIER, CALIFORNIA, ASSIGNOR OF ONE-HALF TO CLARENCE J. PERKINS, OF LOS ANGELES, CALIFORNIA

QUICK ACTING COUPLING

Application filed November 12, 1929. Serial No. 406,628.

This invention relates to quick acting couplings, that is to say, couplings of the type in which one element of the coupling is thrust into the other and then locked by a rotary movement. Couplings of this type have been heretofore constructed consisting of an outer coupling member with a bore to receive the inner coupling member, the bore of the outer coupling member being provided with lugs that project radially inwardly, and the head of the inner coupling member being provided with similar lugs which pass inwardly between the lugs of the outer coupling member when the two parts are being thrust together before the rotation occurs that interlocks them, but heretofore the lugs on the two coupling members have been of substantially equal width, measured circumferentially with respect to the axis of the coupling. The faces of the lugs that engage against each other have heretofore been tapered circumferentially so that as the rotation occurs, the inner coupling member will be drawn further into the outer coupling member so as to seat its inner end against the seat in the outer coupling member.

It has been found in practice that in using tapered lugs there is a tendency for the coupling to work loose.

The general object of this invention is to produce a coupling of this general type, but having a construction which will prevent rotary movement occurring after the coupling members have been interlocked, that is to say, one of my objects is to provide a construction which will overcome the difficulties pointed out above.

A further object of the invention is to provide a coupling of this type which is so constructed as to avoid the use of soft packing and which will operate to produce a tight metal to metal connection in the coupling.

Further objects of the invention will appear hereinafter.

The invention consists of novel parts and combination of parts to be described hereinafter, all of which contribute to produce an efficient quick acting coupling.

A preferred embodiment of the invention is described in the following specification, while the broad scope of the invention is pointed out in the appended claims.

In the drawing:

Figure 1 is a longitudinal central section through a coupling embodying my invention.

Figure 2 is an elevation of the coupling viewing it from its right and as illustrated in Figure 1.

Figure 3 is an end elevation of the coupling from the left end of Figure 1.

Figure 4 is a section similar to Figure 1, but broken away and showing the inner coupling member in elevation instead of in section.

In practicing my invention I provide an outer coupling member 1 which is of substantially annular form having a bore 2 within the same, which bore is provided at one end of the coupling member with a plurality of inwardly projecting lugs 3, said lugs being preferably located equidistant circumferentially around the coupling member. These lugs project inwardly, of course, in a radial direction toward the axis of the coupling. The inner faces 4 of the lugs 3 lie in a plane substantially at right angles to the axis of the coupling. In other words, they are preferably disposed along a helical line about the axis of the coupling.

The inner coupling member 5 is of tubular form with an enlarged head 6 at its inner end and this head is provided on its outer side with a plurality of shoulders 7, which shoulders are formed on the rear faces of circumferential lugs or tongues 8 which correspond in number to the lugs 3.

The long lugs or circumferential tongues 8 are disposed equidistant around the coupling and are disposed apart so as to form gaps 9 between them. These gaps are of sufficient width to pass the lugs 3 in assembling the coupling, as will be described hereinafter. The inner end of the coupling member 5 is intended to come against a fixed seat. In some couplings this seat might be a part of the outside coupling 1, but I prefer to form this seat on a separate part (see Figure 1) by providing a nipple 10 having a conical seat face 11 at its inner end and having a collar 12 presenting an annular shoulder or face 13 for backing up the seat and resisting pressure against it. In order to do this I provide threads 17 at the inner end of the bore 2 and into these threads I screw a means for engaging the shoulder 13. This means is preferably in the form of a follower ring 14, and this follower ring 14 and the adjacent end of the outer coupling member may be provided with means for locking the follower ring in a plurality of different positions, thereby enabling the position of the seat face 11 to be adjusted.

In this connection in order to insure a tight joint within the coupling, it is preferable to employ a seat ring 15 (see Figure 1) that is set into the inner end of the coupling member 5. This seat ring presents a conical seat face 16 that comes against the seat 11. The character of this ring will depend upon the special service in which the coupling is employed. It may be made of copper, bronze, Monel metal, or any other suitable metal which is sufficiently rigid to resist the pressure against the seat 11, but soft enough to insure a tight joint.

The follower ring 14 may be tightened up by means of a spanner wrench applied in spanner holes 18.

I provide means for locking this follower ring in a plurality of different adjusted positions. Any suitable locking means may be employed for this purpose, preferably consisting of a locking pin 19 in the form of a through bolt having a head 20 at one end which is countersunk into the face 21 of the outer coupling member and provided at its other end with threads to receive a removable head 22 which is applied as a nut on the end of the pin and tightened up by means of a screw driver slot 23 (see Figure 3). This head or nut 22 is countersunk into the adjacent face of the outer coupling member by providing a circular recess 24 which is completed by alignment with equidistant arcuate notches 25 formed in the adjacent edge of the follower ring. By unscrewing the head 22 the follower ring may be tightened up so as to bring the next notch 25 into alignment with the recess 24, whereupon the head or nut 22 can be replaced.

The coupling is preferably constructed as illustrated in Figure 2, in which the inwardly projecting lugs, such as the lug 25, and the corresponding lugs 26 on the inner coupling member, are formed without taper but with interlocking means, such as the notch 27 on the engaging face of the lug 26. In assembling the coupling of this construction, the coupling members are simply interlocked so that the inwardly projecting lugs are received in their notches 27 and the coupling is then tightened up by a wrench applied to the follower ring 28. The advantage of this type of coupling is that it does not tend to come loose if the coupling is roughly handled. The form of the coupling shown in Figures 1 to 4, if roughly handled, may tend to come loose, if the taper on the engaging faces of the lugs is too steep, that is to say, if the inclined faces of the lugs are on too great a pitch.

It is understood that the embodiment of the invention described herein is only one of the many embodiments this invention may take, and I do not wish to be limited in the practice of the invention, nor in the claims, to the particular embodiment set forth.

I claim:

1. In a quick-acting coupling, the combination of an outer coupling member of substantially tubular form, a nipple extending into the coupling member from one side having an annular shoulder at its inner end with a tapered seat, a follower ring threaded into the outer coupling member and engaging the annular shoulder to hold the nipple in position, said outer coupling member having a plurality of lugs projecting radially inwardly toward the axis of the coupling and disposed substantially equidistant around the circumference of the coupling member, an inner coupling member constructed to be interlocked with the said outer coupling member and having a tapered metallic seat to engage the first named seat, said inner coupling having a plurality of circumferential shoulders thereon formed with gaps between the shoulders to receive the lugs when the inner coupling member is thrust into the outer coupling member and so as to permit the rotation of the inner coupling member thereafter to bring the first named lugs into position behind the said circumferential shoulders, said lugs and shoulders having interlocking means for preventing relative rotary movement of one of the coupling members with respect to the other.

2. In a quick acting coupling, the combination of an outer coupling member of substantially tubular form, a nipple extending into the outer coupling member from one side and having an annular shoulder at its inner end with a seat, a follower ring threaded into the outer coupling member and engaging the annular shoulder to hold the nipple in position, said outer coupling member having a plurality of lugs projecting radially inwardly toward the axis of the coupling and disposed around the axis of the coupling, an inner coupling member constructed to be interlocked with the said outer coupling member and having a plurality of circumferential shoulders thereon with gaps between the shoulders to receive the said lugs when the inner coupling member is thrust into the outer coupling member and so as to permit the rotation of the inner coupling member thereafter to bring said lugs into position behind the said circumferential shoulders, said lugs and shoulders having interlocking means for preventing relative rotary movement of one of the coupling members with respect to the other, a metallic seat on the inner coupling member to cooperate with said first-named seat, said follower ring operating when tightened up, to maintain said interlocking means in engagement to prevent accidental relative rotation of the inner coupling member and the outer coupling member.

3. In a quick acting coupling, the combination of an outer coupling member of substantially tubular form, a nipple extending into the outer coupling member from one side and having an annular shoulder at its inner end with a seat, a follower ring threaded into the outer coupling member and engaging the annular shoulder to hold the nipple in position, said outer coupling member having a plurality of lugs projecting radially inwardly toward the axis of the coupling and disposed around the axis of the coupling, an inner coupling member constructed to be interlocked with the said outer coupling member and having a plurality of circumferential shoulders thereon with gaps between the shoulders to receive the said lugs when the inner coupling member is thrust into the outer coupling member and so as to permit the rotation of the inner coupling member thereafter to bring said lugs into position behind the said circumferential shoulders, said outer coupling member having a notch in at least one of said circumferential shoulders to receive one of said lugs and thereby lock the inner coupling member and outer coupling member against relative rotary movement, said inner coupling member having a metallic seat to come upon said first-named seat, said follower ring operating when tightened up, to maintain the notch and its corresponding lug in engagement with each other.

4. In a quick acting coupling, the combination of an outer coupling member of substantially tubular form, a nipple extending into the outer coupling member from one side and having an annular shoulder at its inner end with a seat, a follower ring threaded into the outer coupling member and engaging the annular shoulder to hold the nipple in position, said outer coupling member having a plurality of lugs projecting radially inwardly toward the axis of the coupling and disposed around the axis of the coupling, an inner coupling member constructed to be interlocked with the said outer coupling member and having a plurality of circumferential shoulders thereon with gaps between the shoulders to receive the said lugs when the inner coupling member is thrust into the outer coupling member and so as to permit the rotation of the inner coupling member thereafter to bring said lugs into position behind the said circumferential shoulders, said shoulders having notches respectively to receive said lugs for preventing relative rotary movement of one of the coupling members with respect to the others, said inner coupling member having a metallic seat to come upon said first-named seat, said follower ring operating, when tightened up, to maintain the lugs in the notches and thereby prevent accidental relative rotation of the inner coupling member and the outer coupling member.

Signed at Whittier, California this 2nd day of November 1929.

ROY C. CROSLEN.